July 4, 1939. R. E. GUNTHER 2,164,813
ELECTRIC CULINARY UTENSIL
Filed Sept. 8, 1936 2 Sheets-Sheet 1
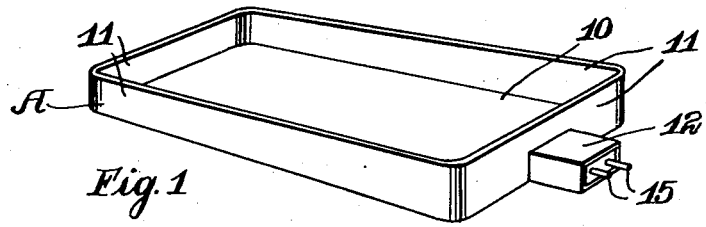
Fig. 1
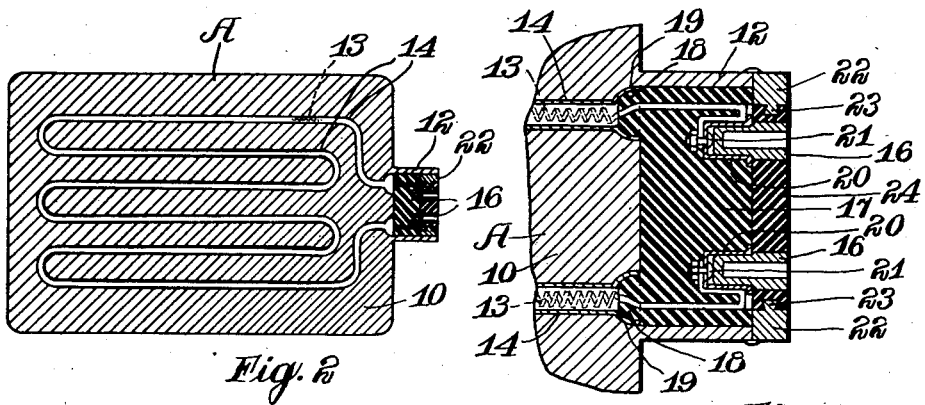
Fig. 2
Fig. 3
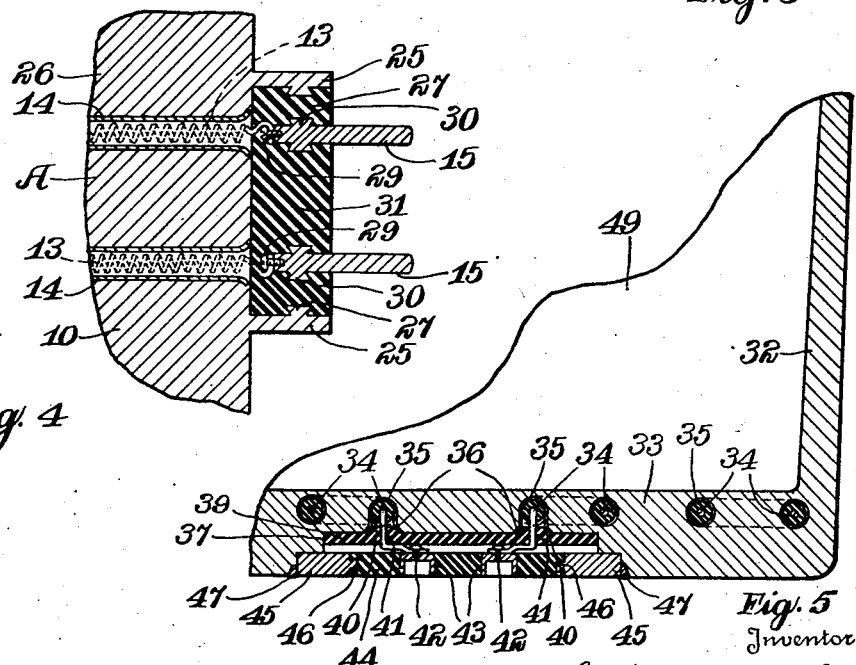
Fig. 4
Fig. 5
Inventor
Robert E. Gunther
By Howard L. Fischer
Attorney July 4, 1939.  R. E. GUNTHER  2,164,813
ELECTRIC CULINARY UTENSIL
Filed Sept. 8, 1936  2 Sheets-Sheet 2
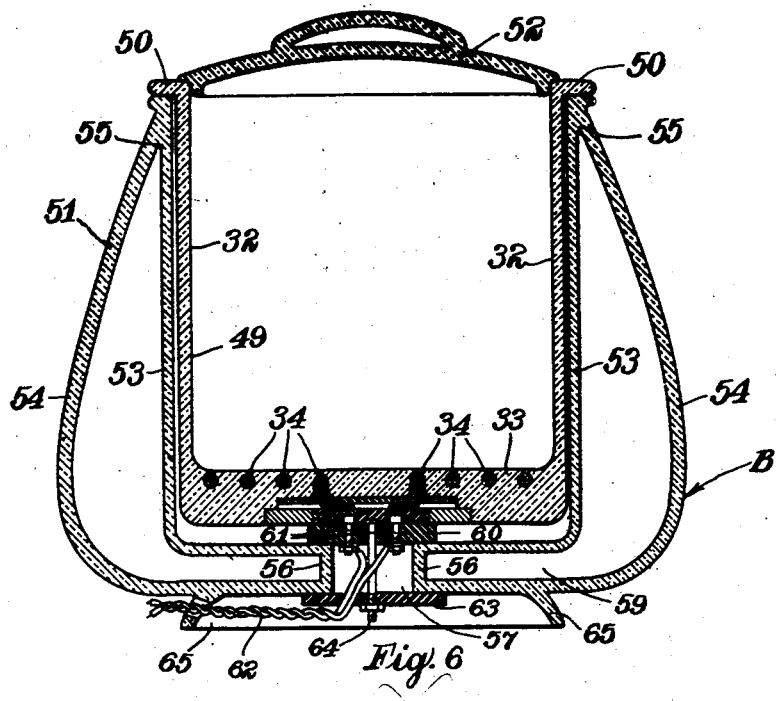
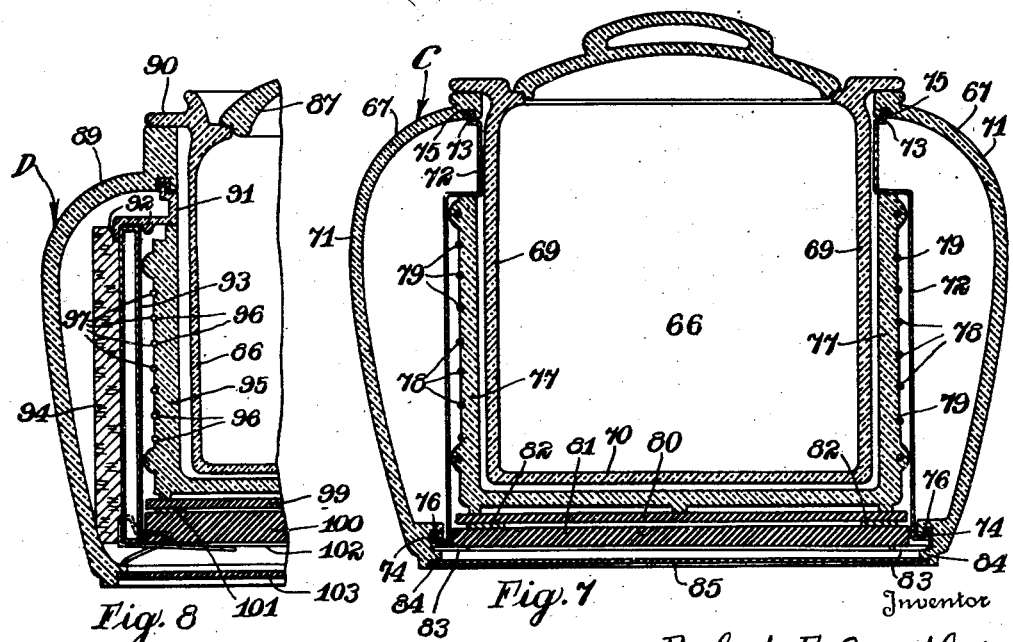
Inventor
Robert E. Gunther
By Howard Fisher
Attorney Patented July 4, 1939

2,164,813

UNITED STATES PATENT OFFICE 2,164,813

ELECTRIC CULINARY UTENSIL

Robert E. Gunther, St. Paul, Minn.

Application September 8, 1936, Serial No. 99,790

4 Claims. (Cl. 219—44)

My invention relates to an improvement in electric culinary utensil, designed to provide a means of cooking by electricity at an extremely low cost.

It is a feature of my invention to provide a heating element cast directly in the utensil, where the utensil is formed of metal or other castable material. In this way, all of the heat developed by the element must be transmitted to the utensil, as there is no other avenue of escape. It may be seen that such a construction must be extremely efficient, and will permit the utensil to be heated, and remain hot, at an extremely low cost.

It is a further feature of my invention to provide a seal, by means of which all moisture is kept out of the heating element. By the use of this seal, it is possible for me to provide a cooking utensil containing a heating element, which utensil may be immersed in water, and washed. This is a feature of extreme importance, as every electric utensil with which I am familiar must be washed merely by wiping off the surface thereof. Immersion of such former heating element utensils would seriously damage the same. By means of my seal, moisture is effectively kept out of the electrical element.

It is a further feature of my invention to enclose the utensil containing the electrical heating unit in a vacuum chamber, or within an outer container including a wall of vacuum, or partial vacuum. Virtually all of the heat transmitted by the heating element to the utensil may in this manner be retained in the utensil, causing the device to operate with a very high efficiency. This wall of vacuum may be between the double walls of an outer container formed of glass or the like; may be formed within a double wall container formed of metal or of ceramic material; or may be a container having an outer wall of one material, and an inner lining wall secured to the outer wall, with a partial vacuum between these walls.

It is a further feature of my invention to provide a utensil which, when used in conjunction with an outer container including a vacuum wall, is removable from this outer container. This inner container is so designed that, when formed of cast metal, the electrical heating element may be cast directly in the body of the same. When removed, my cooking utensil is so designed that it may automatically disengage from electrical contacts in electrical connection with a source of supply of electrical current. The lifting of the utensil cooking portion from the outer container disengages this portion from contacts mounted in the outer container. This permits the cooking portion to be washed without danger of short circuit or electrical shock.

These and other features and novel objects of my invention will be more clearly and fully set forth in the following specification and claims.

In the drawings forming a part of my specification:

Figure 1 is a perspective view of a skillet form of utensil embodying my invention.

Figure 2 is a cross-sectional view of the skillet shown in Figure 1 of the drawings, the section being taken on a plane parallel to, and spaced from, the bottom of the utensil to show the embedded element.

Figure 3 is an enlarged detail of a form of construction of my seal for sealing the moisture from the heating element.

Figure 4 is an enlarged detail view in section of a slightly different form of seal from that illustrated in Figure 3 of the drawings.

Figure 5 is a fragmentary cross-sectional view of a pot or pan formed of cast material and embodying my seal for moisture.

Figure 6 is a vertical section taken through the center of an electrical utensil embodying my cast electrical element embodied in a cooking portion enclosed in an outer container.

Figure 7 is a cross sectional view similar to Figure 6, illustrating a different type of construction of utensil embodying an outer vacuum chamber.

Figure 8 is a fragmentary sectional view similar to Figures 6 and 7, showing still a slightly different form of construction of utensil.

My utensil A, illustrated in Figures 1 through 4 of the drawings, comprises a flat bottom portion 10, having provided thereon, if desired, peripheral upstanding walls 11 extending thereabout. Projecting from one side or end thereof is provided a box-shaped member 12 adapted to contain the terminals of the electrical element embedded within the bottom 10. A suitable handle, not shown, may be provided if, and where, desired.

As shown in Figure 2 of the drawings, an electrical heating element 13 is embedded within the base of the utensil A. This heating element 13 is preferably enclosed in a pipe or tube, with the element wire or resistance member being spaced from the walls of the tube by a suitable insulating material, which acts to insulate the element 13 from the pipe or tube 14 electrically, but serves to conduct heat from the element 13 to the tube 14. The heating element is shaped properly to substantially cover the area of the bottom of the utensil A to provide an even heat thereto.

The heating element is electrically connected to plugs 15 as shown in Figure 1 of the drawings, or sockets 16, as shown in Figure 2 of the drawings. This connection is sealed in such a manner that no moisture may enter the ends of the tubes 14 enclosing the heating element 13. This enables the utensil A to be immersed in water for washing purposes without injuring in any way the electrical heating element.

The ends of the tube 14 embedded within the bottom 10 of the utensil A are enlarged or flared outwardly, and extend substantially flush with the edge of the bottom 10 within the box-like portion 12. A block 17 of insulating material fits closely adjacent the edge of the bottom 10, and is provided with nibs 18 which extend into the enlarged ends 19 of the tubes 14, to close the ends of these tubes. Passages are formed through the block 17 to permit the end of the element 13 to extend through this block of insulation. Recesses in the block 17 provide a means of accommodating metallic cups 20, to which the ends of the element 13 are secured by means of bolts 21 or other suitable means.

A metallic rectangle 22 is provided with an internal bead 23 of a shape commonly known as a dove-tail in cross-section. Within this rectangle, which is formed with a central recess containing the internal dove-tail, I cast an insulating portion of Bakelite or other similar material, including a pair of sockets 16 extending therethrough. As Bakelite and other material of this nature, cast under pressure and heat in most forms, has a tendency to shrink slightly as it hardens, it will shrink tightly about the sockets 16, sealing the joint thereto, between the sockets 16 and the cast insulating material 24. The shrinkage of the insulating material 24 from the metallic rectangle causes the dove-tail connection to become even more tight than previously, as may be readily seen. Thus a metallic ring is formed, having cast centrally therein a plate of insulating material having a pair of metallic sockets extending therethrough.

The metallic ring or rectangle 22 is then inserted in place at the end of the box-like portion 12 on the utensil A. The sockets 16 are engaged in the cups 20 recessed in the block 17, to form an electrical contact from the ends of the element 13, through the cups 20 to the sockets 16. The ring or rectangle 22 is then preferably attached integrally to the portion 12 by welding or the like.

With this type of construction, it may be seen that no liquid can pass through the sockets 16, as they are closed at one end. No liquid may pass through the insulation around these sockets 16, due to the shrinkage of the insulation around these sockets. And no moisture can pass through the joint between the insulation and the ring or rectangle 22 due to the shrinkage of this material about the dove-tail shaped bead 23.

My seal may also be formed as illustrated in Figure 4 of the drawings. This figure illustrates a fragmentary portion of an electrical heating element 13 extending into a box-like member 25 cast integrally with the base 26 of the utensil. This box-like member 25 is provided with an internal bead 27 which is of dove-tail shape cross-sectionally. Plugs or prongs 15 (or sockets such as 16) are connected to the ends of the element 13 by means of suitable bolts 29 or the like. If desired, annular flanges 30 in the form of dove-tails may extend around these prongs 15, to additionally anchor these prongs. Bakelite or other suitable insulating material is then cast into the box-like member 25. This material shrinks about the prongs 15, enclosing the same with a liquid-proof connection. The shrinkage of the insulating material, indicated at 31, from the internal bead 27 causes an extremely tight joint between this insulating material and the bead 27, which will not permit leakage of moisture therethrough.

In Figure 5 of the drawings, I have illustrated my seal embodied in a kettle or pan type of utensil, in which the seal is formed in the bottom of the utensil, rather than in the side as in the previously described constructions. In this modification, the pan is provided with side walls 32 and a bottom 33 in which is enclosed an electric heating element 34 enclosed in a tube or pipe 35. The ends 36 of the tube 35 are bent downwardly, and the ends thereof flared outwardly, substantially flush with the surface of a recess 37 in the bottom 33. A disc 39 covers the ends of the tube 35, and is provided with nibs 40 extending into the enlarged or flared ends 36 thereof. Holes 41 through the disc 39 and the nibs 40 permit the ends of the element 34 to extend through the disc. These ends of the element 34 are attached by bolts 42 or other suitable means to the ends of sockets 43 (or may be connected to prongs similar to those of Figure 4 of the drawings).

The sockets 43 are cast into molded insulation 44 within a ring 45 having a dove-tail shaped internal bead 46 thereupon. As in the previous cases, the shrinkage of this insulation material slightly compresses the molded material against the sockets 43, and causes the joint between the insulation material 44 and the ring 45 to become moisture-proof. The ring 45 is welded integrally as shown at 47 to the bottom 33, or otherwise attached with a moisture-proof joint.

Figure 6 of the drawings illustrates a cooking utensil B in which a unit such as that illustrated in Figure 5 of the drawings may be embodied. This figure illustrates an inner cooking container 49 as illustrated in enlarged form in Figure 5, and embodying an electric heating element 34 in the bottom 33 thereof. The side walls 32 are provided with a circumferentially extending flange 50 extending about the same at the top of the walls, to retain this inner container 49 in proper position with relation to the outer container 51. A cover 52 of suitable material extends over the top of the inner container 49.

The outer container 51 comprises an inner wall 53 and an outer wall 54, which are jointed at the top edge 55 thereof. The walls 53 and 54 are also joined to form the walls 56 of a central opening 57 in the bottom 58. A disc 60 of insulating material closes the top of the central opening 57, and supports a pair of spaced prongs 61 which extend into the cups or sockets 43 of the inner container 49. These prongs extend through the disc 60, to provide terminals on the under side thereof to which may be secured the cord 62 through which the current is supplied. A second disc 63 is provided to close the bottom of the central opening 57, and a bolt 64 extends through both discs 60 and 63 to clamp the discs in proper position. The cord 62 extends through the lower disc 63, and out through a circular flange 65 forming the base of the outer container 51. The space between the inner and outer walls 53 and 54 is evacuated, to provide a vacuum or partial vacuum therein.

The utensil indicated as C in Figure 7 of the drawings is shown as including an inner container 66 formed of glass or ceramic material. Obviously, however, the inner container 49 of the construction of Figure 6 could be substituted for the arrangement, using the same or a similar type of outer container 67. In the form illustrated, however, the inner container 66 is provided with relatively thin side walls 69 and a bottom 70 of approximately the same thickness.

The outer container 67 is formed with an outer wall 71 of any desired contour, and is provided with an inner wall 72 spaced from the outer wall 71 to provide a chamber therebetween which may be evacuated to provide a vacuum or partial vacuum. The inner wall is shown anchored to the outer wall, the top edge 73 and bottom edge 74 extending into recesses 75 and 76, respectively, in the outer wall 71 and being cemented, or fused by glazing, or otherwise, firmly in position.

Interposed between the inner wall 72 and the inner container 66, I provide an auxiliary receptacle into which the inner container slidably engages. This auxiliary receptacle 77 is externally grooved at 78 to accommodate a heating element 79 wrapped about this receptacle 77. The receptacle 77 thus forms a part of the heating unit by transmitting the heat from the element 79 to the air space directly surrounding the receptacle 77.

A supporting disc 80 is positioned beneath the receptacle 77, and is spaced from the bottom plate 81 by a washer 82, to provide an air space between these plates 80 and 81. The bottom plate 81 is supported by means of a spider 83 formed of resilient wire or the like, to the lower extremity of the outer wall 71; a shoulder 84 providing a bearing for the spider 83. Within the outer wall 71, below the shoulder 84, I provide a bottom covering plate 85 to seal the bottom of the utensil C.

A slightly different form of construction D is shown in Figure 8 of the drawings. In this form, an inner container 86 similar to that illustrated in Figure 7 is provided. A cover 87 is provided for this inner receptacle. The outer receptacle 89 supports the inner container 86 by engagement with a peripheral flange 90 at the top of the inner container. A guide ring 91 is secured within the outer container 89, having depending flanges 92 thereon for holding a hollow ring 93 in position surrounding the inner container 86. The hollow ring 93 may be evacuated, to provide a vacuum chamber surrounding the inner container 86. Externally of the vacuum chamber, and between this ring 93 and the outer wall or receptacle 89, I provide a ring of insulating material 94.

Interposed between the vacuum chamber 93 and the inner compartment or receptacle 86, I provide an auxiliary receptacle 95 enclosing the major portion of the inner container 86. This receptacle 95 is similar to the receptacle 77, and is externally grooved at 96 to accommodate a heating element 97. The auxiliary receptacle 95 is supported in a manner similar to the receptacle 77, resting upon a disc or plate 99 separated from the bottom plate 100 by a washer 101. The bottom plate 100 is supported by means of a spider 102 to the lower extremity of the outer container 89. A bottom cover plate 103 encloses the bottom of the utensil D. The top of the auxiliary container or receptacle 95 abuts the ring 91, which holds these parts in proper relationship. The spider 102 also supports the hollow evacuated ring 93.

It may be seen that I have provided a utensil which may be made in slightly different forms. The utensils which are enclosed, however, are provided with a vacuum space extending about the same; and in each case the receptacle adapted to contain the material to be cooked is washable, and immersible in water. It may also be seen that my utensil is extremely efficient, as the insulation directs all of the heat from the heating element to the cooking receptacle.

Although I have illustrated a series of preferred embodiments of my invention, it will be readily understood that various changes coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. The method of forming a utensil comprising enclosing an electrical heating element within a continuous metallic tubular member extending from end to end thereof, and casting a utensil body portion about said tubular member.

2. A utensil comprising two containers, an inner and an outer container engageable one within the other, a heating element within said outer container connected to a suitable source of current supply, and a removable hermetically sealed vacuum chamber interposed between said outer container and said heating element.

3. A utensil comprising two containers engageable one within the other, the outer of said containers including a removable hermetically sealed vacuum chamber extending about said inner container, and a heating element between said inner and outer containers spaced from said vacuum chamber.

4. A utensil comprising two containers engageable one within the other, a removable hermetically sealed vacuum chamber positioned within the outer of said containers and a heating element interposed between said vacuum chamber and the inner of said containers.

ROBERT E. GUNTHER.